J. J. SEELMAN.
PROCESS FOR WITHDRAWING FLUIDS FROM SEALED CONTAINERS WITHOUT CONTAMINATION.
APPLICATION FILED MAR. 10, 1920.
1,392,454. Patented Oct. 4, 1921.
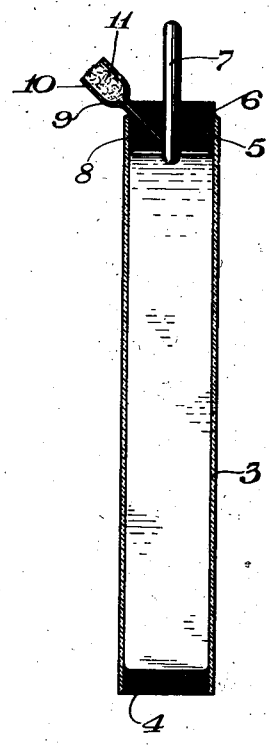
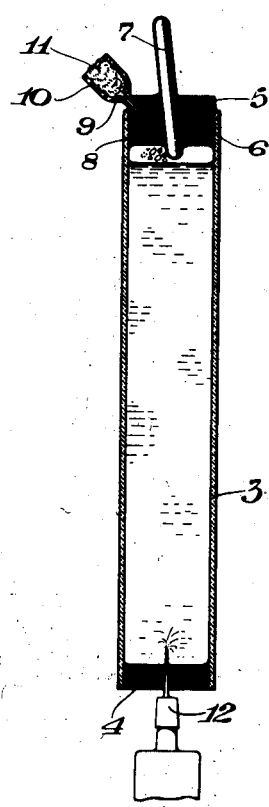

UNITED STATES PATENT OFFICE.

JOHN J. SEELMAN, OF MILWAUKEE, WISCONSIN.

PROCESS FOR WITHDRAWING FLUIDS FROM SEALED CONTAINERS WITHOUT CONTAMINATION.

1,392,454. Specification of Letters Patent. Patented Oct. 4, 1921.

Application filed March 10, 1920. Serial No. 364,862.

*To all whom it may concern:*

Be it known that I, JOHN J. SEELMAN, a citizen of the United States, and resident of Milwaukee, in the county of Milwaukee and State of Wisconsin, have invented new and useful Improvements in Processes for Withdrawing Fluid from Sealed Containers Without Contamination, of which the following is a description, reference being had to the accompanying drawings, which are a part of this specification.

The invention relates to a process for withdrawing semi-fluid or fluid from a bulk container for use for injection purposes into human or animal bodies whereby contamination of the fluid remaining in the container is prevented.

Usually fluids or semi-fluids which are injected subcutaneously, intravenously or intramuscularly into animal tissue with a hypodermic syringe are withdrawn from bulk containers by the syringe and that portion of the fluid which is withdrawn is replaced by atmospheric air, which, as is well known, contains mole spores and disease bacteria that will necessarily affect the remaining fluid in the container, rendering it unfit for use for subsequent injections.

By the present process liability of contamination of the fluid for injection purposes is reduced to a minimum in a manner hereinafter more fully described.

In the drawings Figure 1 is a view of an apparatus used in connection with the process showing it sealed, and Fig. 2 is a similar view of the apparatus showing the fluid being removed therefrom.

Referring to the drawings numeral 3 designates a glass tube which is provided with a rubber bottom commonly known as a dam 4 and a rubber stopper 5. The stopper 5 has an opening 6 therein normally closed by a solid glass or metal stopper 7 and an inclined duct 8 communicates with the opening 6 at a short distance above the bottom or the inner side of the stopper 5. A tube 9 having an enlarged portion 10 communicates with the duct 8 and the larger portion of said tube is provided with antiseptic absorbent cotton 11. This cotton may be treated with a liquid antiseptic, if desired, or if sufficient cotton is used for purifying the quantity of air to fill the tube 3 this antiseptic is not necessary.

My method of withdrawing the fluid from the container 3 so that said fluid may not be contaminated and so that it may be injected by use of a syringe into human or animal bodies in any of the well known ways is to introduce purified air into this container as the fluid is withdrawn from the container through the needle of the syringe 12. This I preferably do by puncturing the rubber dam 4 with the needle of the syringe so as to withdraw the fluid from this end of the tube while sterilized air passing through the duct 8 is allowed to enter the interior at the other end of the tube by canting the stopper 7 in the opening 6 so as to form a communicating duct in the opening 6 between the duct 8 and the interior of the tube. In this way the fluid is withdrawn from one end through the sterilized needle out of contact with the air and any vacuum within the tube, by reason of the withdrawal of the liquid, is prevented from forming and the pressure is reestablished in the tube by the introduction in the other end of air which is purified during its passage through the cotton. With the withdrawal of the needle of the syringe 12 the rubber dam seals itself and upon the release of the stopper from its inclined position the remaining contents of the tube are sealed therein with the purified air so that the syringe may be again charged from the receptacle without danger of contamination of the fluid therein.

What I claim as my invention is:

1. The process of withdrawing fluid used for injection purposes from a container for said fluid, which consists in drawing the fluid into the needle of the syringe kept out of contact with the air and simultaneously introducing into the space in the container not occupied by fluid sterilized air to take the place of the withdrawn fluid.

2. The process of withdrawing a fluid for injection purposes from a container for the same without contamination, which consists in removing the fluid from one end of the container through the needle of the syringe inserted through a self-sealing opening and introducing purified air into the other end of the container to equalize the pressure therein during the withdrawal of the fluid and then cutting off the supply of purified air on the removal of the syringe from the container.

In testimony whereof, I affix my signature.

JOHN J. SEELMAN.